US005416671A

United States Patent [19]

Uchida

[11] Patent Number: 5,416,671

[45] Date of Patent: May 16, 1995

[54] REFLECTOR FOR VEHICULAR LAMP

[75] Inventor: Naoki Uchida, Shizuoka, Japan

[73] Assignee: Koito Manufacturing Co., Ltd., Tokyo, Japan

[21] Appl. No.: 253,555

[22] Filed: Jun. 3, 1994

[30] Foreign Application Priority Data

Jun. 3, 1993 [JP] Japan ..................................... 5-156369

[51] Int. Cl.[6] ........................... B60Q 1/04; F21V 7/09

[52] U.S. Cl. ....................................... 362/61; 362/346; 362/348

[58] Field of Search .................. 362/346, 61, 304, 348, 362/302, 297

[56] References Cited

U.S. PATENT DOCUMENTS 4,208,704 6/1980 Draper ................................ 362/297
4,704,661 11/1987 Kosmatka ........................ 362/346 X
4,755,919 7/1988 Lindae et al. ........................ 362/304
4,841,423 6/1989 Luciani ............................... 362/304
4,972,307 11/1990 Takatsuji et al. .................. 362/61 X
5,079,677 1/1992 Kumagri ............................... 362/61
5,171,082 12/1992 Watanabe ........................ 362/346 X
5,258,897 11/1993 Nino .................................... 362/346
5,361,193 11/1994 Nino .................................... 362/346

*Primary Examiner*—Ira S. Lazarus
*Assistant Examiner*—Thomas M. Sember
*Attorney, Agent, or Firm*—Surghue, Mion, Zinn, Macpeak & Seas

[57] ABSTRACT

A pair of converging sections is provided on right and left sides of the principal optical axis of a reflector, and an area excluding the converging sections is made a horizontally diffusing region. Rays reflected by the converging sections contribute to formation of a converged portion of a light distribution pattern, and rays reflected by the horizontally diffusing region contribute to formation of a horizontally diffused portion. The converging sections have an elliptical paraboloid or paraboloid-of-revolution surface. The horizontally diffusing region is so constructed that the horizontal diffusion angle increases with the distance from the principal optical axis in the horizontal direction.

11 Claims, 5 Drawing Sheets

FIG. 8 (a)
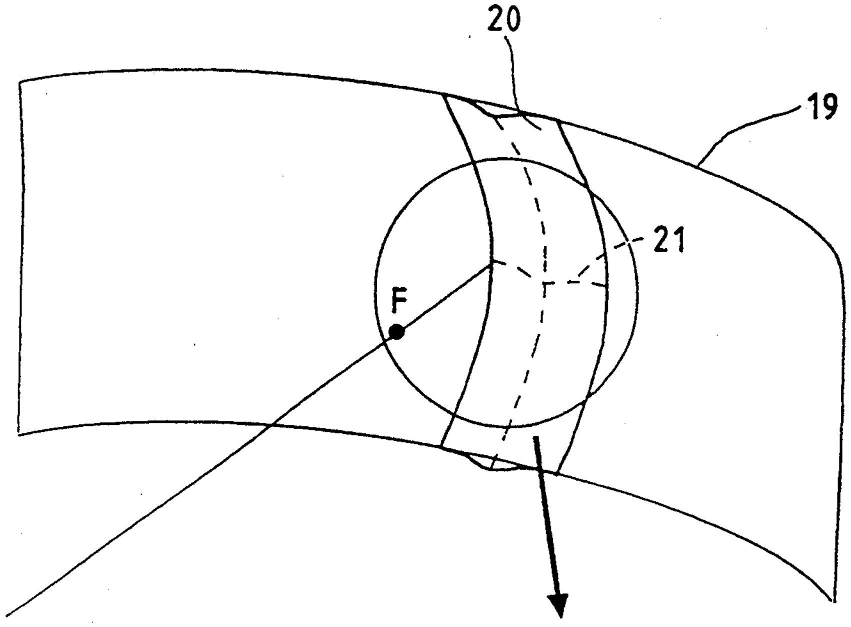
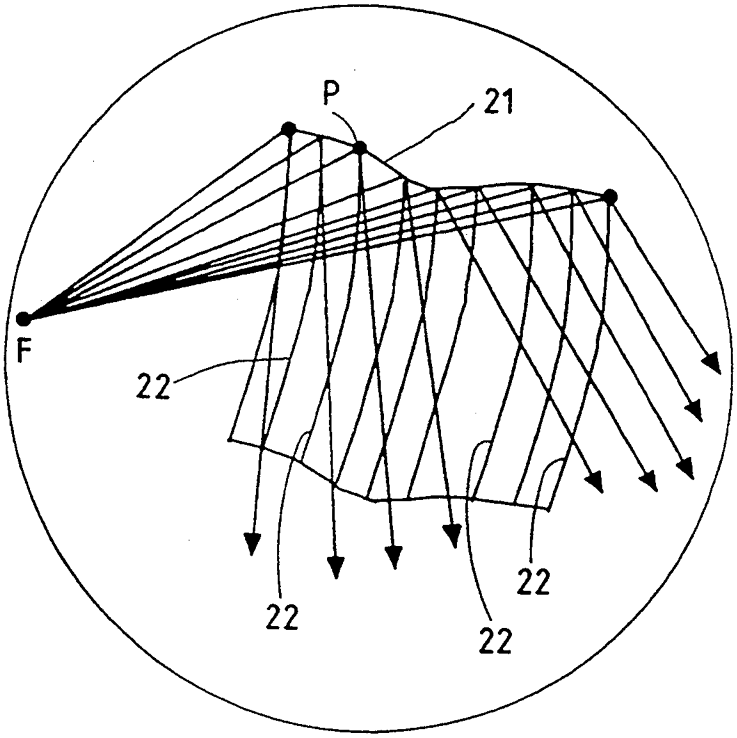
FIG. 8 (b)

REFLECTOR FOR VEHICULAR LAMP

BACKGROUND OF THE INVENTION

The present invention relates to a reflector for a vehicular lamp.

To attain good visibility for both a shoulder portion of a road and a distant front field in a well balanced manner, light distribution patterns of automobile headlamps are standardized so as to have horizontally diffused portions and a converged portion as a brightness center, which conflict with each other in implementation.

For example, light distribution patterns of fog lamps are required to have horizontally diffused portions and a converged portion occupying a central portion between those diffused portions.

However, it is difficult for conventional lamps to form both of the horizontally diffused portions and the converged portion. That is, an excessive degree of horizontal diffusion makes the brightness of the converged portion insufficient. Conversely, if too much weight is given to the brightness of the converged portion, the converged portion becomes conspicuous compared to the horizontally diffused portions, which means an unsatisfactory brightness distribution.

SUMMARY OF THE INVENTION

An object of the present invention is to provide a novel reflector for a vehicular lamp which can attain horizontal diffusion in a light distribution pattern while securing a sufficient central brightness.

According to the invention, a vehicular lamp capable of producing a light distribution pattern including a horizontally diffused portion and a converged portion serving as a brightness center, comprises:

- a light source extending along a principal optical axis of a reflector; and
- the reflector comprising:
  - a pair of converging sections provided on right and left sides of the principal axis and having an elliptical paraboloid or paraboloid-of-revolution reflecting surface, for reflecting light rays emitted from the light source so that the reflected light rays contribute to formation of the converged portion of the light distribution pattern; and
  - a diffusing region occupying a reflecting area of the reflector excluding the converging sections, for reflecting light rays emitted from the light source while diffusing those with a horizontal diffusion angle increasing with a distance from the principal optical axis in the horizontal direction so that the reflected rays contribute to formation of the horizontally diffused portion of the light distribution pattern.

With the above constitution, rays contributing to formation of the converged portion of a light distribution pattern are produced by the converging sections, and the diffusing region provides the horizontal diffusion angle that increases with the distance from the principal optical axis in the horizontal direction. Therefore, when the horizontally diffused portion and the converged portion are combined to produce a light distribution pattern, there can be obtained a brightness distribution that is well balanced between those portions.

BRIEF DESCRIPTION OF THE DRAWINGS

FIGS. 8(*a*) and 8(*b*) illustrate how to form a surface for smoothly connecting small reflecting sections.

DESCRIPTION OF THE PREFERRED EMBODIMENTS

A reflector of a vehicular lamp according to the present invention will be described in detail by way of illustrated embodiments.

Figure 1:
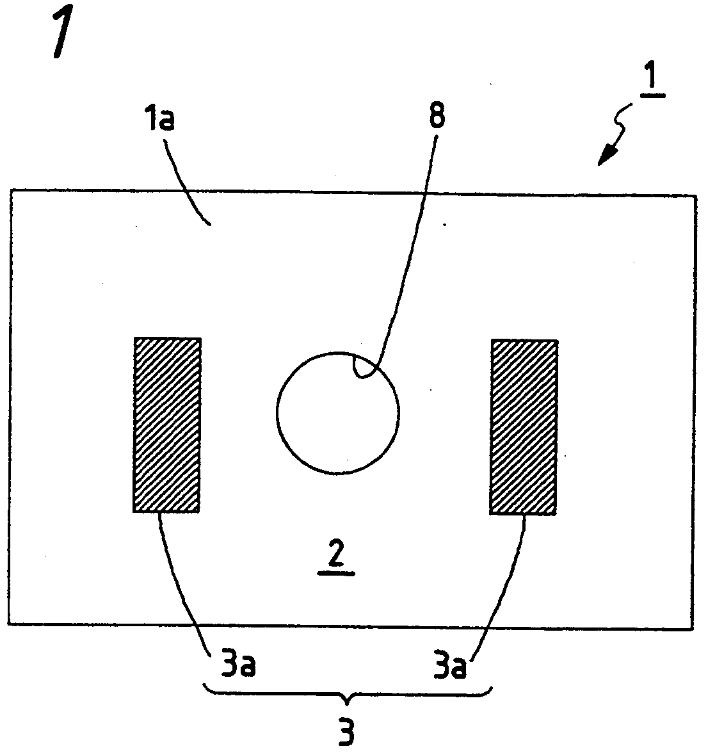
FIG. 1 is a front view schematically showing a configuration of a reflector of a vehicular lamp according to the present invention.

FIG. 1 is a schematic front view of a reflector 1 for a vehicular lamp. A reflecting surface 1*a* is divided into a horizontally diffusing region 2 and a converging region 3, which collectively define a principal optical axis of the reflecting surface 1*a*.

The horizontally diffusing region 2 contributes to formation of horizontally diffused portions in a light distribution pattern, and occupies most of the reflecting surface 1*a*.

The horizontally diffusing region 2 may be a single surface, or a composite surface consisting of a number of small reflecting sections.

An example of the former design is a reflecting surface (hereinafter referred to as "special parabolic surface") disclosed in Japanese Patent Application Unexamined Publication No. Sho. 50-127487 (filed by Koito Manufacturing Co., Ltd.).

This special parabolic surface has a reference curve in a horizontal plane including the optical axis, and the reference curve is represented by $y^2=4fx+ax^n$ where the optical axis is selected as the x axis and the horizontal and vertical axes perpendicular to the optical axis are employed as the y and z axes, respectively, and f is a focal length and a and n are constants.

Figure 2:
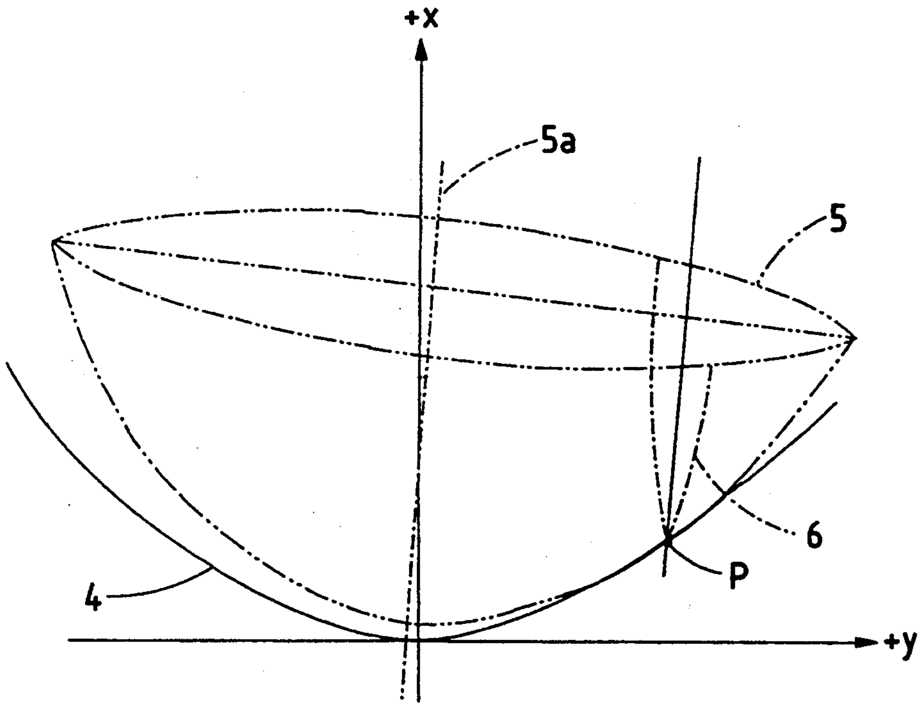
FIG. 2 illustrates a special parabolic surface.

FIG. 2 shows how the special reflecting surface is formed.

Reference numeral 4 denotes a reference curve. An imaginary paraboloid of revolution 5 has a rotation axis 5*a* in the plane of the reference curve 4, shares the focus with the reference curve, and contacts with the reference curve at point P.

An intersection line 6 obtained by cutting the imaginary paraboloid of revolution 5 by an imaginary plane passing through point P and in parallel with the rotation axis 5*a* and the z axis (perpendicular to the paper surface of FIG. 2) is a parabola. As point P is moved along the reference curve 4, imaginary paraboloids of revolution, imaginary planes, and their intersection lines are obtained accordingly.

The special parabolic surface is obtained as a collection of those intersection lines. Therefore, the diffusion angle can be varied continuously in the horizontal direction by controlling the degree of horizontal diffusion by designation of the parameters a and n of the equation representing the reference curve 4. Because of the reflecting characteristics of parabolas, reflected rays are parallel in vertical cross-sections.

As an example of the latter design, the horizontally diffusing region 2 may be constituted of a number of small reflecting sections. In this case, a fundamental surface of the small reflecting sections is made a hyperbolic paraboloid.

Figure 3:
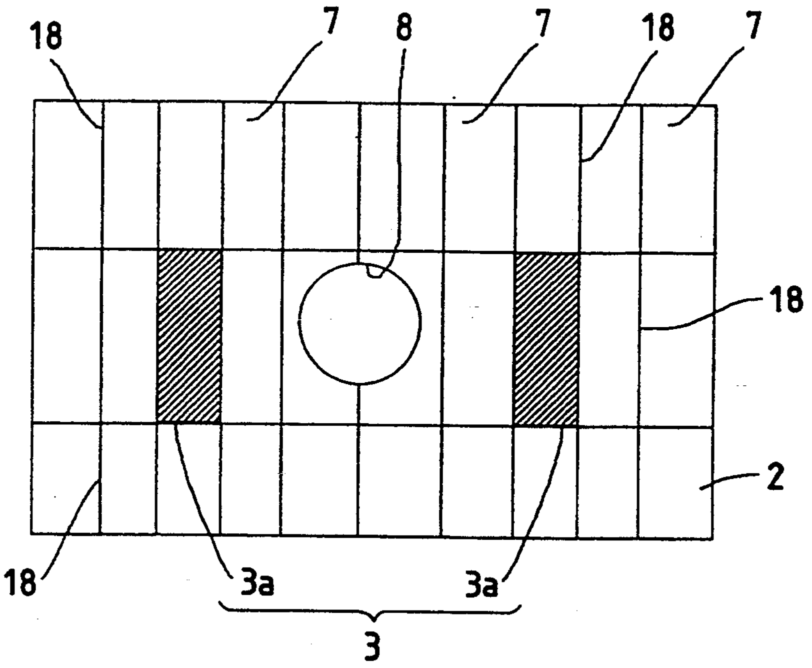
FIG. 3 is a front view showing an example of a reflecting surface in which a horizontally diffusing region is constituted of a number of small reflecting sections.

For example, as shown in FIG. 3, the horizontally diffusing region 2 is divided into three in the vertical direction, and small reflecting sections 7 are allocated to a paraboloid-of-revolution surface as a reference surface.

Since the horizontal cross-section of each of the small reflecting sections 7 is a parabola that is convex toward the front, light is diffused in the horizontal direction. The degree of horizontal diffusion can be controlled by inclining the axial directions of the respective small reflecting sections with respect to the reference surface.

On the other hand, the converging region 3 contributes to formation of a converged portion as a brightness center in a light distribution pattern, and occupies limited regions of the reflecting surface 1*a*.

For example, as shown in FIG. 1, the converging region 3 may be constituted of two sections 3*a* which are arranged substantially symmetrically in the horizontal direction with respect to a bulb attaching hole 8 that is formed in a central portion of the reflecting surface 1*a*. The sections 3*a* are located at positions on the reflecting surface 1*a* which enable most stable light ray control.

A fundamental surface of the converging region 3 is made a paraboloid of revolution or an elliptical paraboloid. In either case, both of a horizontal cross-section and a vertical cross-section are a parabola that is concave toward the front. This is so because a light beam reflected by the converging region 3 is required to form a spot occupying a particular area of a light distribution pattern.

A reflector 1A according to a first embodiment of the invention will be described with reference to FIGS. 4 and 5(*a*) and 5(*b*).

Figure 4:
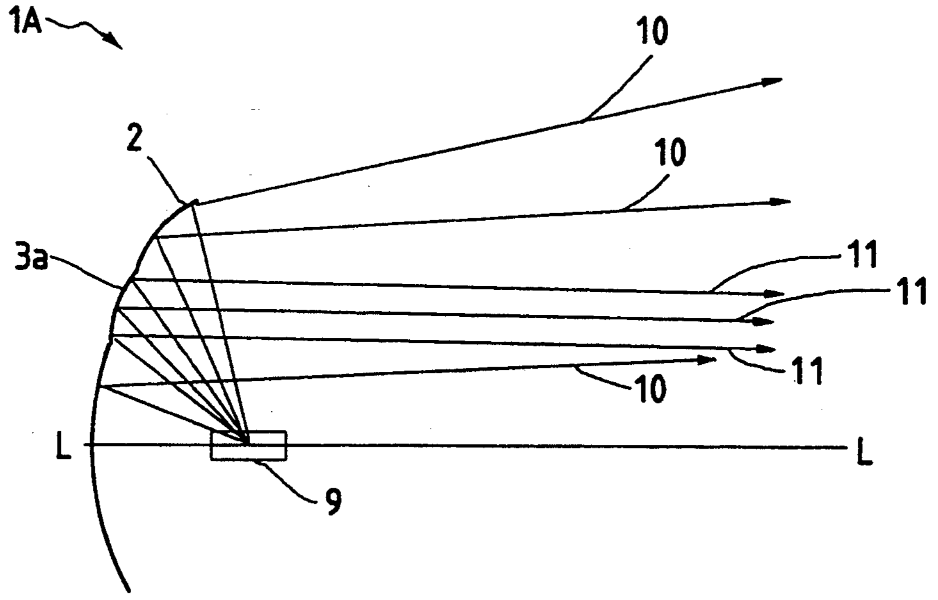
FIG. 4 schematically shows a reflector according to a first embodiment of the invention.

FIG. 4 schematically shows a horizontal sectional shape of a reflecting surface in which a special parabolic surface is used in the horizontally diffusing region 2 and an elliptical paraboloid surface is used in the converging region 3. A filament 9 is disposed such that its central axis extends along the principal optical axis L—L of the reflector 1A and its center coincides with the focus of the special parabolic surface.

To combine the diffusing surface of the special parabolic surface and the converging surface of the elliptical paraboloid surface, the foci of those surfaces are placed at the same position, and the center of the converging section 3*a* is placed at a desired position on the special parabolic surface and the axis of the converging section 3*a* is inclined so that a ray reflected at the center point is directed to the center of a converged portion of a light distribution pattern.

Among light rays emitted from the center of the filament 9, rays 10 reflected by the horizontally diffusing region 2 are diffused more as the reflecting point goes away from the optical axis. Rays 11 reflected by the converging region 3 travel in parallel with each other.

Figure 5A:
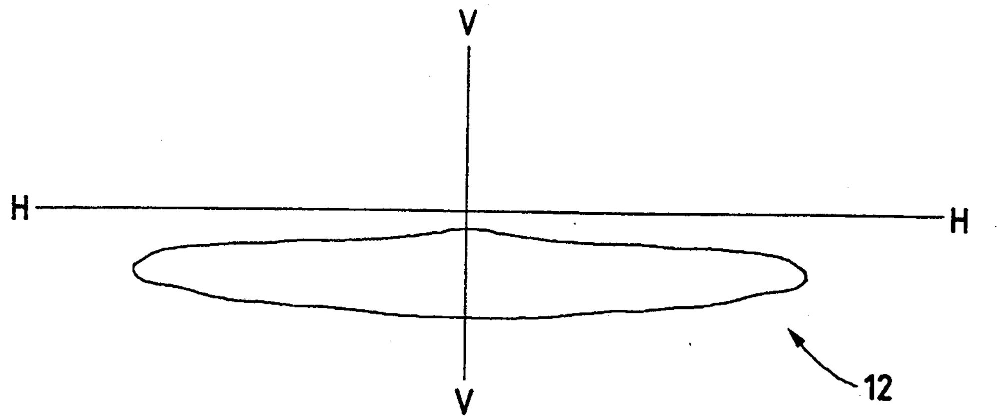
FIGS. 5(*a*) and 5(*b*) schematically show projection patterns produced by a horizontally diffusing region and a converging region of the reflector of FIG. 4, respectively.
Figure 5B:
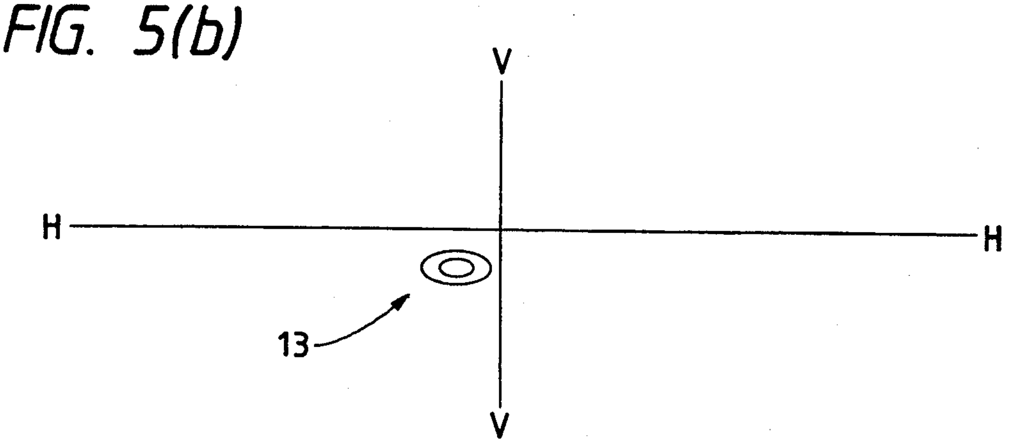

FIGS. 5(*a*) and 5(*b*) show a pattern 12 produced by the horizontally diffusing region 2 and a pattern 13 produced by the converging region 3, respectively. Lines H—H and V—V represent a horizontal line and a vertical line, respectively.

As shown in FIG. 5(*a*), the pattern 12 is diffused in the horizontal direction, and its vertical width decreases with the distance from the vertical line V—V. As shown in FIG. 5(*b*), the pattern 13 is a restricted pattern located at a position a little deviated to a lower-left direction from the intersection of the horizontal line H—H and the vertical line V—V.

A pattern produced by the entire reflecting surface is a combination of the patterns 12 and 13. Since the diffusion angle is larger with the reflecting point being more distant from the principal optical axis L—L in the horizontal cross-section of the horizontally diffusing region 2, the portion of the pattern 12 closer to the pattern 13 is brighter and the brightness decreases with the horizontal distance from the vertical line V—V. Therefore, there does not occur a problem that the pattern 13 becomes conspicuous.

A reflector 1B according to a second embodiment of the invention will be described with reference to FIGS. 6 and 7(*a*) and 7(*b*).

Figure 6:
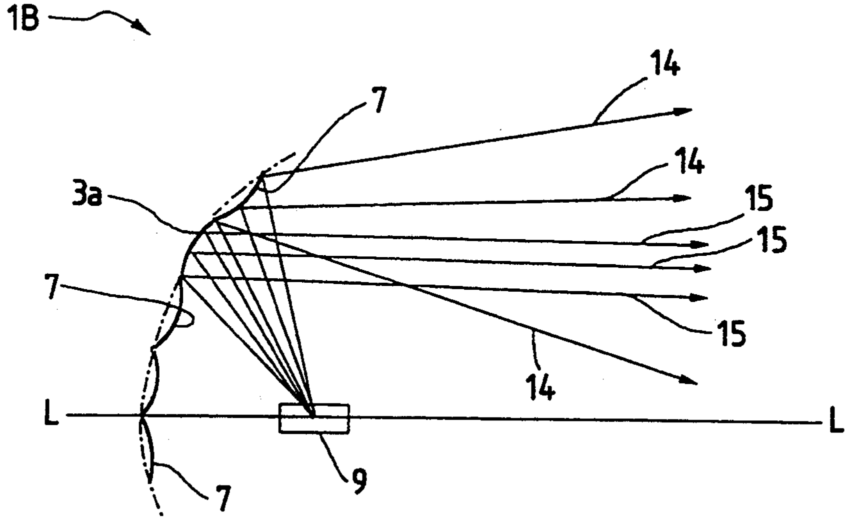
FIG. 6 schematically shows a reflector according to a second embodiment of the invention.

FIG. 6 schematically shows a horizontal sectional shape of a reflecting surface in which the horizontally diffusing region 2 is constituted of small reflecting sections 7 that are hyperbolic paraboloid surfaces and an elliptical paraboloid surface is used in the converging region 3. A filament 9 is disposed such that its central axis extends along the principal optical axis L—L of the reflector 1B and its center coincides with the focus of a paraboloid-of-revolution surface as a reference surface of the small reflecting sections 7.

In the horizontally diffusing region 2, the small reflecting sections 7 are allocated to the reference surface so that the small reflecting section 7 more distant from the principal optical axis L—L in the horizontal direction has a larger horizontal diffusion angle.

The elliptical paraboloid converging region 3 is also allocated to the same reference surface.

In the allocation to the reference surface, the foci of the reference surface and the converging region 3 are placed at the same position, and the center of the converging section 3*a* is placed at a desired position on the reference surface and the axis of the converging section 3*a* is inclined so that a ray reflected at the center point is directed to the center of a converged portion of a light distribution pattern.

Among light rays emitted from the center of the filament 9, rays 14 reflected by the horizontally diffusing region 2 are diffused in the horizontal direction, and rays 15 reflected by the converging region 3 travel in parallel with each other.

Figure 7A:
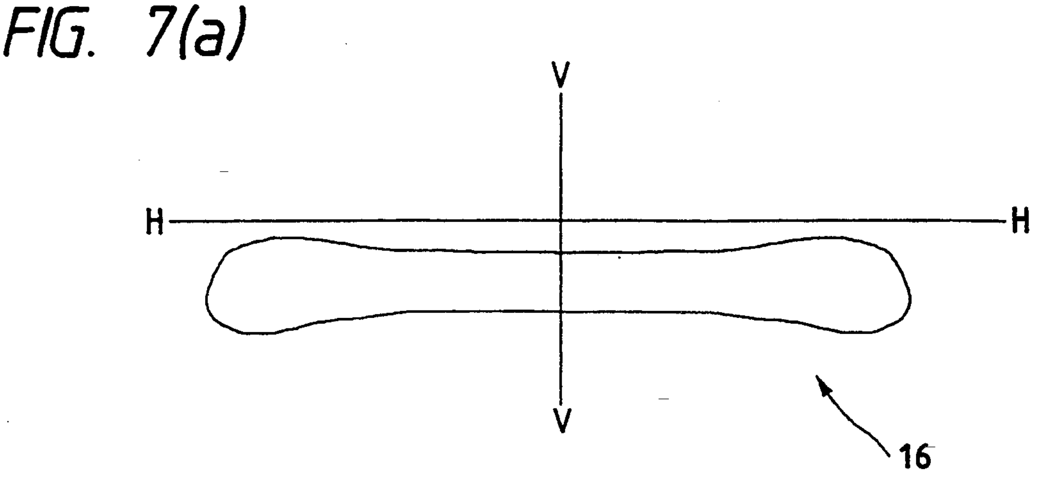
FIGS. 7(*a*) and 7(*b*) schematically show projection patterns produced by a horizontally diffusing region and a converging region of the reflector of FIG. 6, respectively.
Figure 7B:
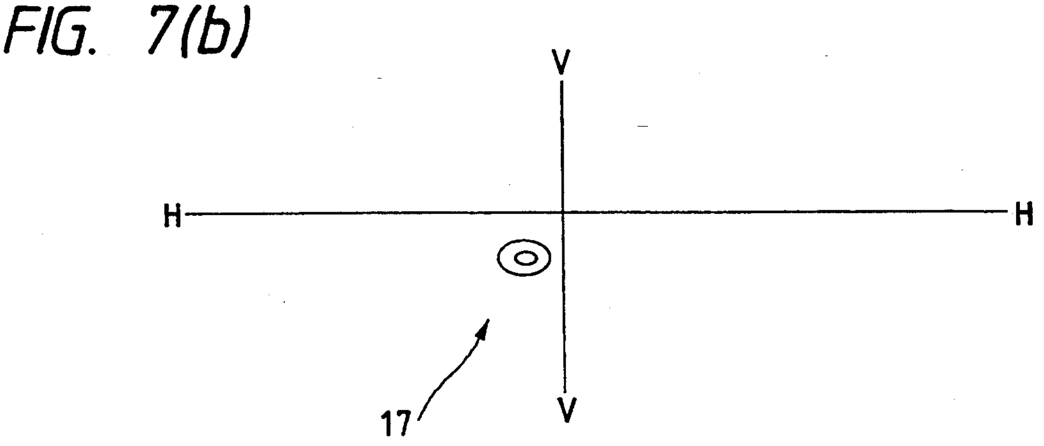

FIGS. 7(*a*) and 7(*b*) show a pattern 16 produced by the horizontally diffusing region, 2 and a pattern 17 produced by the converging region 3.

As shown in FIG. 7(*a*), the pattern 16 is diffused in the horizontal direction, and has a little wider vertical width at portions close to the right and left ends of the pattern 16. As shown in FIG. 7(*b*), the pattern 17 is a restricted pattern located at a position a little deviated to a lower-left direction from the intersection of the horizontal line H—H and the vertical line V—V.

By properly arranging the small reflecting regions 7 that constituting the horizontally diffusing region 2, a brightness distribution of a combination of the patterns 16 and 17 can be made such that the portion of the pattern 16 closer to the pattern 17 is brighter and the brightness decreases with the horizontal distance from the vertical line V—V.

By the way, as shown in FIG. 3, since the small reflecting sections 7 are not connected to each other smoothly, steps at the boundaries appear as vertical lines 18 when the reflecting surface is viewed from the front-side. Because of a limitation of accuracy in molding, it becomes difficult to control rays reflected at the boundaries to travel in desired directions, causing glare or reducing the efficiency of light beam utilization.

Further, where the horizontal sectional shape of the small reflecting section 7 is represented by a quadratic equation, that is, it is a parabola, in which case there is no degree of freedom to be used for changing the shape except for the focal length, rays cannot be controlled finely by a single small reflecting section.

A method for smoothly connecting the adjacent small reflecting sections 7 at the boundaries will be described below.

FIG. 8(*a*) shows a small reflecting section 20 that is a part of a reflecting surface 19 in the horizontally diffusing region 2. In general, a reference curve 21 in a horizontal cross-section is made an Nth-order curve ($N \geqq 3$).

As also shown in FIG. 8(*b*) in an enlarged manner, it is assumed that a point light source is placed at point F on the horizontal plane. The reflecting surface is formed as a collection of parabolas 22 whose axes extend along rays reflected at arbitrary points P on the reference curve 21 after being emitted from the point F.

That is, a curved patch is determined giving, to the arbitrary points P on the reference curve 21, parabolas whose axes extend along directions of rays reflected at the arbitrary points P. This is a generalization of the method of forming a special parabolic surface.

However, in connecting the adjacent small reflecting sections, the conditions of continuity and tangential line continuity need to be imposed on the reflecting surface being formed. Further, the shape of the reference curve 21 needs to be determined so that the horizontal diffusion angle gradually increases as the position on the reflecting surface approaches the periphery in the horizontal direction.

Figure 9:
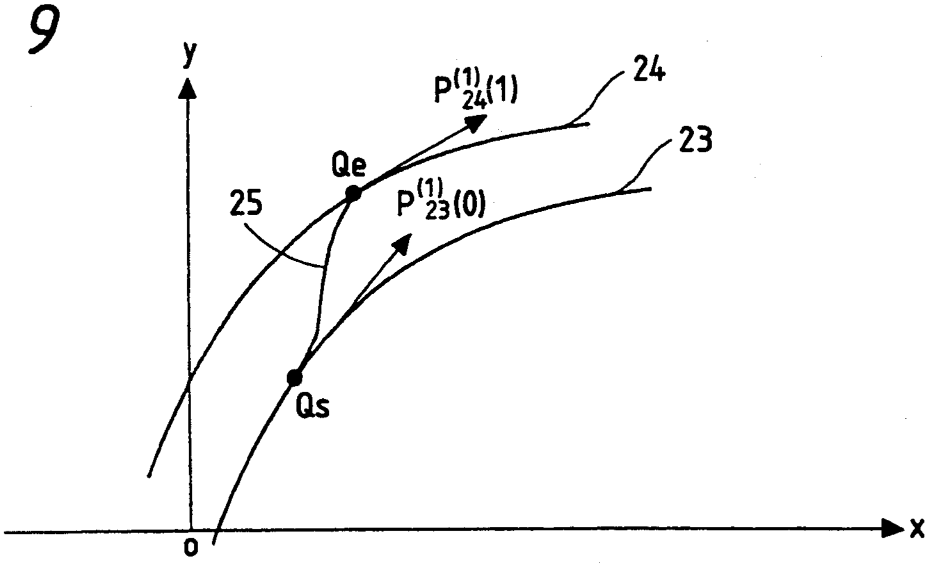
FIG. 9 illustrates how to generate a curve represented by a third-order equation.

As an example, FIG. 9 shows a case of connecting, by a third-order curve 25, points Qs and Qe respectively located on two parabolas 23 and 24 (references) existing in the horizontal plane and having different focal lengths.

That is, the parabola 24 located outside (more distant from the x axis) the parabola 23 is given a longer focal length, and the reference curve is determined by a Ferguson curve segment starting from point Qs on the parabola 23 and ending at point Qe on the parabola 24.

A third-order formula using a parameter (t) is a lowest order polynomial that represents a spatial curve. If a Ferguson curve segment is represented by a vector function f(t), position vectors of points Qs and Qe are respectively denoted by $P_{23}(0)$ and $P_{24}(1)$, and tangential vectors at those points are respectively denoted by $P^{(1)}_{23}(0)$ and $P^{(1)}_{24}(1)$ (the superscript (1) means a first-order derivative), the following vector equation is obtained:

$$f(t)=[t^3\ t^2\ t\ 1]A[P_{23}(0)\ P_{24}(1)\ P^{(1)}_{23}(0)\ P^{(1)}_{24}(1)]^T$$

where A is a 4-row, 4-column matrix of constants and the superscript T means transposing.

Control can be so made that a ray reflected at a point on the reference curve 21 more distant from the optical axis is more diffused in the horizontal direction by forming the reference curve 21 by connecting a plurality of curve segments as described above, and setting the focal lengths of the parabolas serving as the references of the curve segments so that the parabola more distant from the optical axis has a longer focal length.

By employing the reflecting surface formed according to the above procedure as the horizontally diffusing region 2, the reflecting surface designing can be performed so as not to produce steps at the boundaries between the adjacent small reflecting sections.

As is apparent from the above description, according to the reflector of a vehicular lamp of the invention, the light distribution control by the reflecting surface for the horizontal diffusion and that for formation of the converged portion can be performed independently, and the horizontally diffusing portion can provide the horizontal diffusion angle that increases with the distance from the center in the horizontal direction. Therefore, when the pattern produced by the horizontally diffused region and the restricted pattern produced by the converging region are combined together, there do not occur such problems that the brightness of the converged portion is insufficient and that the converged portion is conspicuous compared to the horizontally diffused portion.

The horizontally diffusing region may have a reflecting surface that is constituted of a special parabolic surface or a plurality of small reflecting sections each having a hyperbolic paraboloid surface. To avoid problems, such as occurrence of glare, caused by steps at the boundaries between the adjacent small reflecting sections, the horizontally diffusing region may have a reflecting surface which has a horizontal sectional line (reference curve) represented by a vector equation of a third or higher order polynomial, and is an envelope of paraboloids of revolution that have axes in the horizontal plane including the reference curve and contact with the reference curve.

What is claimed is:

1. A vehicular lamp capable of producing a light distribution pattern including a horizontally diffused portion and a converged portion serving as a brightness center, said vehicular lamp comprising:

a reflector; and a light source extending along a principal optical axis of the reflector;

the reflector comprising:

a pair of converging sections provided on right and left sides of the principal optical axis, arranged substantially symmetrically in a horizontal direction with respect to the principal optical axis, and having an elliptical paraboloid or paraboloid-of-revolution reflecting surface, for reflecting light rays emitted from the light source so that the reflected light rays contribute to formation of the converged portion of the light distribution pattern; and a diffusing region occupying a reflecting area of the reflector excluding the converging sections, for reflecting light rays emitted from the light source while diffusing those with a horizontal diffusion angle increasing with a distance from the principal optical axis in the horizontal direction so that the reflected rays contribute to formation of the horizontally diffused portion of the light distribution pattern.

2. The vehicular lamp of claim 1, wherein a reflecting surface in the diffusing region has, when cut by a horizontal plane including the principal optical axis, a horizontal sectional line represented by $y^2=4fx+ax^n$ where x is a coordinate along the principal optical axis, y is a coordinate along the horizontal direction, f is a focal length, a is a constant, and n is a constant larger than 1, and is formed as an envelope of paraboloids of revolution that have axes in the horizontal plane including the principal optical axis and share focal lengths with and contact with the horizontal sectional line.

3. The vehicular lamp of claim 1, wherein the diffusing region includes a plurality of small reflecting sections each having a hyperbolic paraboloid surface.

4. The vehicular lamp of claim 3, wherein a reference curve that is a horizontal sectional line of the small reflecting sections as cut by a horizontal plane including the principal optical axis is represented by a vector equation of a third or higher order polynomial, and the reflecting surface in the diffusing region is formed as an envelope of paraboloids of revolution that have axes in the horizontal plane including the principal optical axis and contact with the reference curve.

5. A vehicular lamp capable of producing a light distribution pattern including a horizontally diffused portion and a converged portion serving as a brightness center, said vehicular lamp comprising:

a reflector; and a light source extending along a principal optical axis of the reflector;

the reflector comprising:

a pair of converging sections provided on right and left sides of the principal optical axis and having an elliptical paraboloid or paraboloid-of-revolution reflecting surface, for reflecting light rays emitted from the light source so that the reflected light rays contribute to formation of the converged portion of the light distribution pattern; and a diffusing region occupying a reflecting area of the reflector excluding the converging sections, for reflecting light rays emitted from the light source while diffusing those with a horizontal diffusion angle increasing with a distance from the principal optical axis in a horizontal direction so that the reflected rays contribute to formation of the horizontally diffused portion of the light distribution pattern, wherein the diffusing region includes a plurality of small reflecting sections each having a hyperbolic paraboloid surface; and further wherein a reference curve that is a horizontal sectional line of the small reflecting sections as cut by a horizontal plane including the principal optical axis is represented by a vector equation of a third or higher order polynomial, and the reflecting surface in the diffusing region is formed as a envelope of paraboloids of revolution that have axes in the horizontal plane including the principal optical axis and contact with the reference curve.

6. The vehicular lamp of claim 1, wherein a focal point of the converging sections and a focal point of the diffusing region are co-located at the same position.

7. The vehicular lamp of claim 1, wherein the vehicular lamp is a fog lamp.

8. The vehicular lamp of claim 7, wherein substantially all of the light rays reflected by the reflector contribute to the formation of a light distribution pattern located below a horizontal line.

9. The vehicular lamp of claim 1, wherein at least one of axes of the pair of converging sections is inclined from the principal optical axis.

10. The vehicular lamp of claim 1, wherein all of light rays emitted from the light source are reflected by the reflector toward a front side.

11. A vehicular lamp capable of producing a light distribution pattern that is substantially symmetrical with respect to a vertical center line, said pattern including a horizontally diffused portion and a converged portion serving as a brightness center, said vehicular lamp comprising:

a reflector; and a light source extending along a principal optical axis of the reflector;

the reflector having a reflecting area and comprising:

a converging portion, said converging portion consisting of a pair of converging sections provided on right and left sides of the principal optical axis, arranged substantially symmetrically in a horizontal direction with respect to the principal optical axis, and having an elliptical paraboloid or paraboloid-of-revolution reflecting surface, for reflecting light rays emitted from the light source so that the reflected light rays contribute to formation of the converged portion of the light distribution pattern; and a diffusing portion, said diffusing portion occupying a reflecting area of the reflector excluding the converging portion, for reflecting light rays emitted from the light source while diffusing those with a horizontal diffusion angle increasing with a distance from the principal optical axis in the horizontal direction so that the reflected rays contribute to formation of the horizontally diffused portion of the light distribution pattern.

* * * * *